US009574927B2

(12) United States Patent
Milone

(10) Patent No.: US 9,574,927 B2
(45) Date of Patent: Feb. 21, 2017

(54) PRINTED HYDROSTATIC VERSATILE MULTIPLE LIQUID LEVEL SWITCH

(76) Inventor: Christopher J. Milone, Sewell, NJ (US)

( * ) Notice: Subject to any disclaimer, the term of this patent is extended or adjusted under 35 U.S.C. 154(b) by 4 days.

(21) Appl. No.: 13/507,617

(22) Filed: Jul. 13, 2012

(65) Prior Publication Data

US 2014/0015342 A1 Jan. 16, 2014

(51) Int. Cl.
*H01H 29/28* (2006.01)
*G01F 23/24* (2006.01)
*H01H 35/18* (2006.01)

(52) U.S. Cl.
CPC ............ *G01F 23/242* (2013.01); *G01F 23/243* (2013.01); *H01H 35/18* (2013.01); *Y10T 307/779* (2015.04)

(58) Field of Classification Search
USPC .... 200/182, 190, 61.2, 61.21; 340/612, 620; 73/290 R, 304 R, 313; 338/211, 212
See application file for complete search history.

(56) References Cited

U.S. PATENT DOCUMENTS

| | | | | |
|---|---|---|---|---|
| 3,623,366 A * | 11/1971 | Rowell | ........................... | 73/301 |
| 3,935,739 A * | 2/1976 | Ells | ....................... | G01F 23/265 |
| | | | | 324/664 |
| 5,309,722 A | 5/1994 | Phillips | | |
| 7,661,307 B1 * | 2/2010 | Milone | ....................... | 73/304 R |
| 7,963,164 B2 * | 6/2011 | Ross et al. | .................. | 73/304 C |

* cited by examiner

*Primary Examiner* — Vanessa Girardi
(74) *Attorney, Agent, or Firm* — Burns & Levsinson LLP; John C. Serio

(57) ABSTRACT

A liquid level switch is provided having a first elongated substrate having one, two or three or more pairs of elongated electrical conductors thereon, a second elongated substrate having one two or three or more electrically conductive areas thereon, each electrically conductive area being positioned over an associated pair of electrical conductors positioned on the first elongated non-electrically conductive substrate for enabling electrical bridging contact between conductors of the pairs of electrical conductors, and a substrate coupler is provided for coupling the first and second non-electrically conductive substrates together for providing separation of the non-electrically conductive substrates in the absence of hydrostatic pressure thereon, and for causing contact between the first and second non-electrically conductive substrates in the presence of hydrostatic pressure thereon, producing the electrical bridging contact between pairs of conductors on the first non-electrically conductive substrate, in turn producing multiple level output signals.

15 Claims, 3 Drawing Sheets

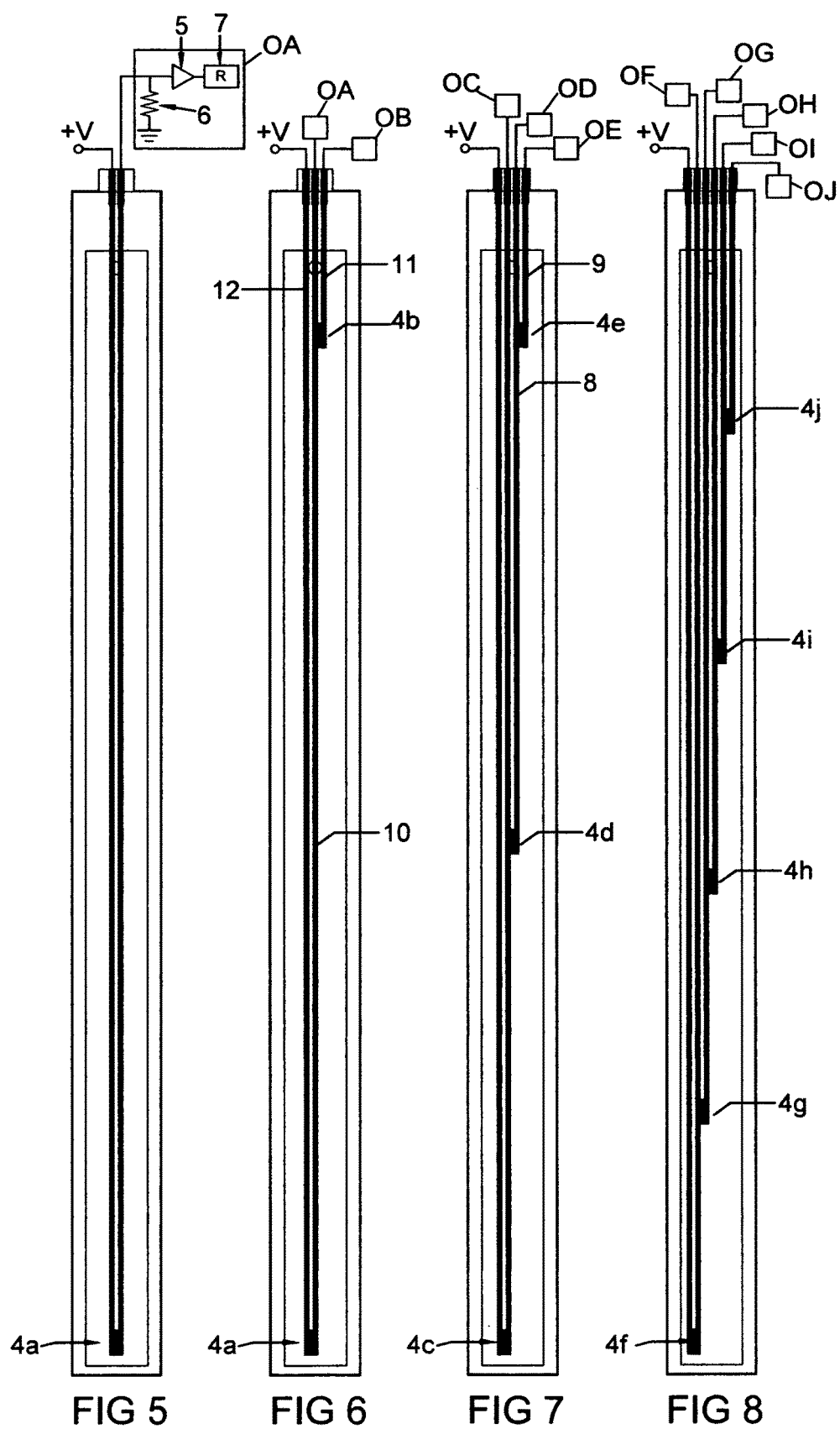

PRINTED HYDROSTATIC VERSATILE MULTIPLE LIQUID LEVEL SWITCH

BACKGROUND OF THE INVENTION

I was motivated to provide a simple inexpensive liquid level switch apparatus for producing an output signal, when the liquid level being monitored is at a high level in a tank, which can shut down a valve halting further liquid to be supplied to the tank to prevent overflow. I also deemed it desirable to have the apparatus produce an output signal when the liquid level being monitored is at a low level in a tank that can cause a valve to supply further liquid to initiate or increase the flow rate of liquid being admitted into the tank.

Such apparatus may also advantageously produce an intermediate level signal as the liquid level continues to fall toward a lower level range. For example, as fuel oil is being consumed in heating a home, a warning indicator can be produced to continuously signal that home owner should make arrangements to have the fuel oil delivered. If the fuel oil is just about to run out, a low level detector can produce an urgency signal when a particular low liquid level is detected.

BRIEF SUMMARY OF PREFERRED EMBODIMENTS OF THE INVENTION

A liquid level switch is provided having a first elongated, non-electrically conductive substrate having a first pattern of one or two pairs of elongated electrical conductors thereon, a second elongated non-electrically conductive substrate having a second pattern of one or two electrically conductive areas thereon, separated from each other, each electrically conductive area being positioned over an associated pair of electrical conductors positioned on the first elongated non-electrically conductive substrate for enabling electrical bridging contact between conductors of the pairs of electrical conductors, and a substrate coupler is provided for coupling the first and second non-electrically conductive substrates together face to face for providing separation of the non-electrically conductive substrates in the absence of hydrostatic pressure thereon, and for causing contact between the first and second non-electrically conductive substrates in the presence of hydrostatic pressure thereon, producing the electrical bridging contact between conductors of one or two pairs of conductors on the first non-electrically conductive substrate, in turn producing high and low level output signals.

BRIEF DESCRIPTION OF THE DRAWINGS

FIGS. 4-7 show the second transparent substrate positioned over the first substrate enabling output signals indicating the presence of particular liquid levels.
FIG. 8 shows additional liquid level detectors while

DETAILED DESCRIPTION OF PREFERRED EMBODIMENTS OF THE INVENTION

Figure 1:
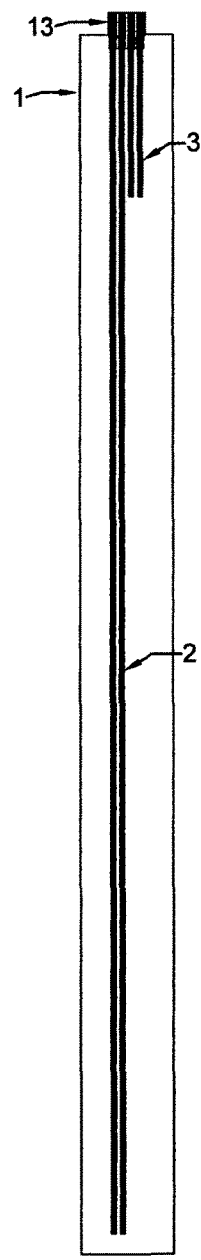
FIG. 1 shows a first lower substrate.

FIG. 1 shows the first lower substrate 1 having a first pair of elongated electrical conductors 2 printed thereon with an electrically conductive ink and a second pair of elongated electrical conductors 3 printed thereon, both pair of conductors being coupled to output terminals 13.

Figure 2:
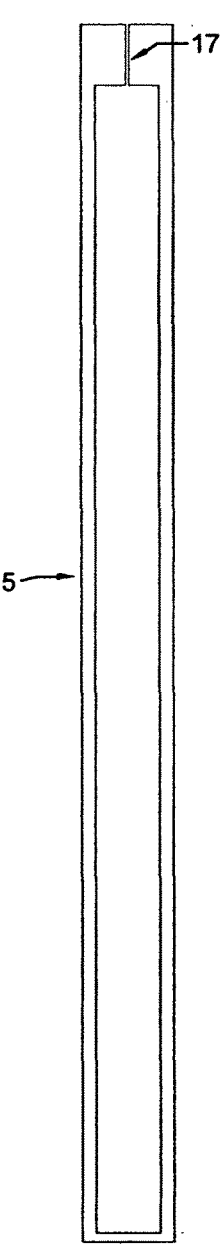
FIG. 2 shows a coupler for coupling the first and second substrates together.
Figure 3:
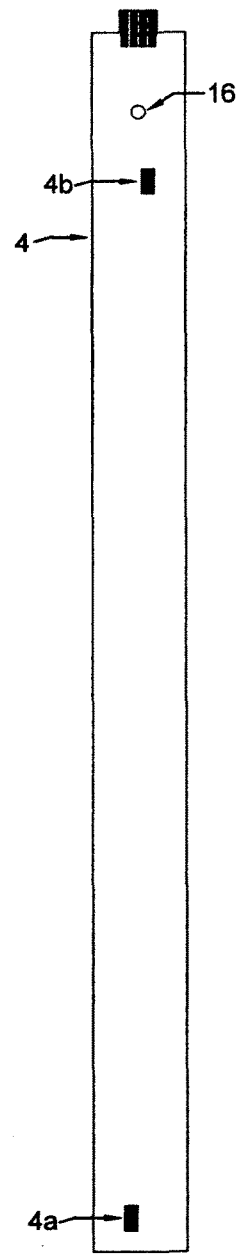
FIG. 3 shows the second upper transparent substrate.

FIG. 3 shows the second upper transparent substrate 4 having small conductive areas 4a and 4b for enabling potential electrical contact bridging of associated pairs of conductors 2 and 3 respectively when the substrates are coupled together by the coupler 5 of FIG. 2. Actual bridging of the conductor pairs occur when particular liquid levels are present over the conductive areas. This action in turn produces output signals on terminals 13 shown in FIG. 1.

The coupler components are preferably thin plastic strips, heat laminated together forming a flexible tape, as mentioned in Milone U.S. Pat. No. 7,661,307 issued Feb. 16, 2010, in column 3, and enable face to face contact of the first and second substrates when the liquid being measured is present that presses against the substrates.

Figure 4:
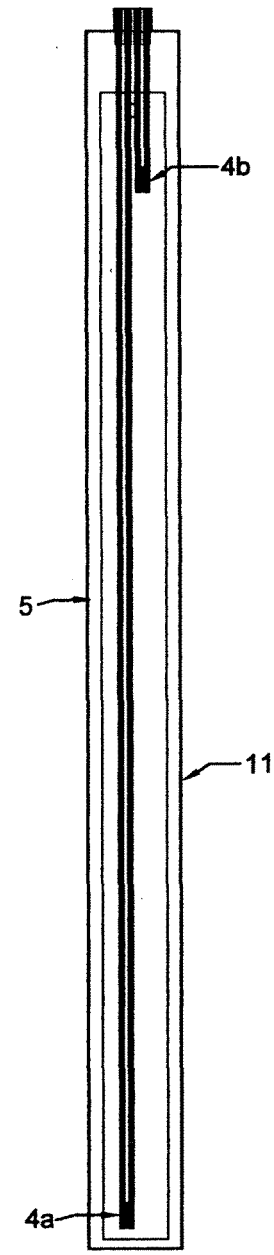

FIG. 4 shows the conductive areas 4a and 4b of FIG. 3 positioned over the elongated conductor pairs when the substrates are coupled together. Note that the conductors are all within the window of the coupler shown in FIG. 2, providing conductive bridging contacts to produce low and high liquid level output signals at terminals 13.

The aforesaid high liquid level signal is produced when conductive area 4b in FIG. 4 is pressed against the conductive pair to the right. The aforesaid low liquid level signal is produced when conductive area 4a is pressed against the conductive pair to the left.

FIG. 5 shows a single conductive pair bridged by a lower level electrically conductive area 4a for producing a low liquid level output signal.

FIG. 6 shows conductive widely separated areas 4a and 4b sharing a common electrical conductor 10 between the inner and outer conductors 11 and 12, thereby to save space and facilitate the multi-level configurations of FIGS. 6, 7 and 8 positioned within the narrow window of the coupler 5 of FIG. 2. FIG. 7 shows a three position liquid level detector employing conductive areas 4c, 4d and 4e positioned over the conductors as shown. FIG. 8 shows a five position liquid level detector employing conductive areas 4f, 4g, 4h, 4i and 4j positioned over the conductors as shown. Additional conductors could be added by printing the conductors in a narrower fashion to allow for the detection of additional level positions and associated output signals.

An exemplary circuit for reading out the tape of FIG. 5 includes output circuit OA coupled to the right hand conductor, and also having a voltage source terminal coupled to the left hand conductor. When conductor 4a of FIG. 5 bridges the conductive pair upon low level fluid detection, a positive pulse is produced across grounded resistor 6, is amplified by amplifier 5 and a self latching relay 7 is actuated to control, for example, a valve circuit that turns on a valve (not shown) for causing fluid to flow into the fluid container in response to the low fluid level detection of 4a bridging the conductive pair.

As shown in FIG. 6, a high fluid level detector can be added which causes conductive area 4b to bridge a second right hand pair of conductors that share a central conductor 10 with the first left hand pair of conductors as shown. Since a voltage terminal is coupled to the left hand output terminal and the central conductor is connected to the aforesaid output circuit OA, a pulse is applied to the aforesaid amplifier in OA upon actuation of lower level conductive area 4a as before.

However, an output circuit OB, identical to OA is actuated upon the bridging of the right hand conductors 10 and 11 by conductive area 4b when the high fluid level is detected because the central conductor is coupled to the aforesaid voltage terminal via the left hand conductor 12 by conductive area 4a.

With the configuration of similar components shown in FIG. 7, a third level can be detected that is intermediate with respect to the high and low level detectors to produce an early warning readout condition of the approaching low level or mid level condition. An additional elongated conductor 9 is added and is connected to output circuit OE. Conductive area 4e is positioned over the conductive pair 8 and 9.

Output circuit OC is actuated upon the bridging action of lower conductive area 4c, output circuit OD is actuated upon the bridging of conductive area 4d, and output circuit OE is actuated upon the bridging action of 4e as is apparent to the worker in the art upon study of the FIG. 7 configuration. These output circuits are similar to output circuit OA.

With the configuration of similar components shown in FIG. 8, additional levels can be detected that are intermediate with respect to the high and low level detectors to produce linear readout conditions that may represent, for example, what percentage a tank is filled.

Note that rather than connecting the voltage terminal to just the left most terminal and feeding the supply voltage through as each successive conductor pair are bridged, the voltage terminal could also be connected to the second, fourth and sixth output terminals and the connection of the output circuits OF, OG and OH to the first, third and fifth output terminals, respectively. However, this configuration supports one less output signal. In the example of FIG. 8 the right hand output signal would be lost.

Figure 9:
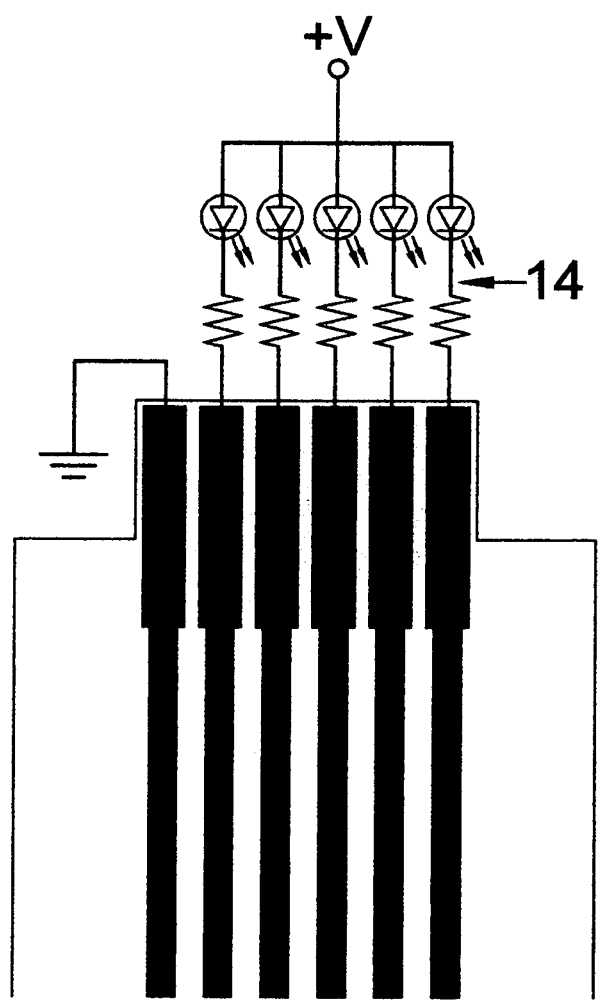
FIG. 9 shows second types of output circuits compared to the first types disclosed in FIGS. 5-8.

FIG. 9 shows an alternative output arrangement of the multi-position level switch of FIG. 8. Whereby, the left most pin is connected to ground instead of the voltage terminal. As the liquid level increases successive conductors are bridged from left to right by successive conductive areas 4f, 4g, 4h, 4i and 4j which allows current to flow through each of the respective LED circuits 14 providing a visual representation of the level in the tank.

A vent hole 16 can be located in the top substrate to allow air to flow in and out of the switch envelope to allow it to equilibrate with the surrounding environment. The vent hole can also be fitted with a hydrophobic or oleophobic membrane to prevent water or oil from entering the switch envelope while still allowing air to pass freely through the membrane. The vent hole 16 is shown at the top of FIG. 3. The vent may also take the form of a channel 17 through the coupler 5 in FIG. 2. This form of the vent was previously disclosed in my earlier U.S. Pat. No. 7,661,307 as 10 in FIG. 7.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the following claims.

What is claimed is:

1. A liquid level switch comprising:
   (a) a first elongated, non-electrically conductive substrate having a first and second pair of elongated electrical conductors thereon;
   (b) a second elongated non-electrically conductive substrate having first and second particular distinct electrical conductive areas thereon, completely electrically separated from each other, each electrically conductive area being positioned over an associated pair of electrical conductors positioned on the first elongated non-electrically conductive substrate for enabling electrical bridging contact between conductors of said pairs of electrical conductors; and
   (c) a substrate coupler for coupling said first and second non-electrically conductive substrates together face to face for providing separation of said non-electrically conductive substrates in the absence of hydrostatic pressure thereon, and for causing contact between said first and second non-electrically conductive substrates in the presence of hydrostatic pressure thereon for producing electrical bridging contact between conductors of the first and second pairs of conductors on the first non-electrically conductive substrate; wherein the electrically conductive areas of the second elongated non-electrically conductive substrate occupy portions of the length of said liquid level switch for producing particular liquid level output signals and wherein at least one of the first and second electrically conductive areas of the second elongated non-electrically conductive substrate occupy a portion of the length of said liquid level switch commensurable to particular liquid level output signal, wherein said electrically conductive areas are positioned along the length of the liquid level switch for producing output signals indicative of different fluid levels to be detected; and wherein a plurality of light emitting diodes are electrically coupled to said elongated electrical conductors for providing a visual representation of the present liquid level; and
   (d) an output circuit, coupled to the liquid level switch for applying a readout voltage to one of the conductors of the said pair of conductors for producing an output pulse on the other of the conductors of the said pair of conductors for indicating a particular detected liquid level, wherein said output pulse is produced across a round resistor that is amplified causing a self-latching relay actuating control of a desired component.

2. The liquid level switch of claim 1 wherein said first and second-pair of elongated electrical conductors of said first elongated non-electrically conductive substrate are laterally coupled together and thus share a common elongated conductor for saving space on said first elongated non-electrically conductive substrate.

3. The liquid level switch of claim 1 wherein said first and second pair of elongated electrical conductors of said first elongated non-electrically conductive substrate are laterally coupled together and thus share a common elongated conductor for saving space on said first elongated non-electrically conductive substrate.

4. The liquid level sensor of claim 1 wherein at least one of the first and second electrically conductive areas occupies a substantial portion of the length of said liquid level sensor for producing a liquid level output signal indicating a predetermined range of liquid level measurements.

5. The liquid level switch of claim 1 wherein each of the first and second conductive areas occupy a small portion of the length of said liquid level switch.

6. The liquid level switch of claim 5 wherein said first and second pair of elongated electrical conductors of said first elongated non-electrically conductive substrate are laterally coupled together and thus share a common elongated conductor for saving space on said first elongated non-electrically conductive substrate.

7. The liquid level switch of claim 1 wherein said first electrically conductive area is positioned near a lower portion of said switch and said second electrically conductive area is positioned near an upper portion of said switch for producing low and high liquid level output signals respectively.

8. The liquid level switch of claim 7 wherein said first and second pair of elongated electrical conductors of said first elongated non-electrically conductive substrate are laterally coupled together and thus share a common elongated conductor for saving space on said first elongated non-electrically conductive substrate.

9. A liquid level switch having a given length comprising:
   (a) a first elongated, non-electrically conductive substrate having a pair of elongated electrical conductors thereon;
   (b) a second elongated non-electrically conductive substrate having an electrically conductive area thereon, said electrically conductive area being positioned over the pair of electrical conductors positioned on the first elongated non-electrically conductive substrate for enabling electrical bridging contact between conductors of said pair of electrical conductors; and
   (c) a substrate coupler for coupling said first and second non-electrically conductive substrates together face to face for providing separation of said non-electrically conductive substrates in the absence of hydrostatic pressure thereon, and for causing contact between said first and second non-electrically conductive substrates in the presence of hydrostatic pressure thereon for producing electrical bridging contact between said pair of electrical conductors on the first non-electrically conductive substrate; and
   (d) wherein the electrically conductive area of the second elongated non-electrically conductive substrate occupies a portion of the length of said liquid level switch commensurable to a particular liquid level output signal, wherein said electrically conductive areas are positioned along the length of the liquid level switch for producing output signals indicative of different fluid levels to be detected; and wherein a plurality of light emitting diodes are electrically coupled to said elongated electrical conductors for providing a visual representation of the present liquid level; and
   (e) an output circuit, coupled to the liquid level switch for applying a readout voltage to one of the conductors of the said pair of conductors for producing an output pulse on the other of the conductors of the said pair of conductors for indicating a particular detected liquid level, wherein said output pulse is produced across a ground resistor that is amplified causing a self-latching relay actuating control of a desired component.

10. A liquid level switch having a given length comprising:
    (a) a first elongated, non-electrically conductive substrate having a first, second and third pair of elongated electrical conductors thereon;
    (b) a second elongated non-electrically conductive substrate having first second and third electrical conductive areas thereon, electrically separated from each other, each electrically conductive area being positioned over an associated pair of electrical conductors positioned on the first elongated non-electrically conductive substrate for enabling electrical bridging contact between conductors of said pairs of electrical conductors; and
    (c) a substrate coupler for coupling said first and second non-electrically conductive substrates together face to face for providing separation of said non-electrically conductive substrates in the absence of hydrostatic pressure thereon, and for causing contact between said first and second non-electrically conductive substrates in the presence of hydrostatic pressure thereon, producing said electrical bridging contact between conductors of the first and second pairs of conductors on the first non-electrically conductive substrate;
    (d) wherein the electrically conductive areas of the second elongated non-electrically conductive substrate occupy different portions of the length of said liquid level switch for producing a particular liquid level output signal and wherein at least one of the first and second electrically conductive areas of the second elongated non-electrically conductive substrate occupy a portion of the length of said liquid level switch commensurable to a particular liquid level output signal, wherein said electrically conductive areas are positioned along the length of the liquid level switch for producing output signals indicative of different fluid levels to be detected; and wherein a plurality of light emitting diodes are electrically coupled to said elongated electrical conductors for providing a visual representation of the present liquid level; and
    (e) an output circuit, coupled to the liquid level switch for applying a readout voltage to one of the conductors of the said pair of conductors for producing an output pulse on the other of the conductors of the said pair of conductors for indicating a particular detected liquid level, wherein said output pulse is produced across a ground resistor that is amplified causing a self-latching relay actuating control of a desired component.

11. The liquid level switch of claim 10 wherein said first and second pair of elongated electrical conductors of said first elongated non-electrically conductive substrate are laterally coupled together and thus share a common elongated conductor and wherein a voltage terminal is connected to a conductor of said first pair of elongated electrical conductors.

12. The liquid level switch of claim 10 wherein each of the first second and third electrically conductive areas of the second elongated non-electrically conductive substrate occupy a small portion of the length of said liquid level switch for indicating particular liquid level output signals.

13. The liquid level switch of claim 12 wherein said first and second pair of elongated electrical conductors of said first elongated non-electrically conductive substrate are laterally coupled together and thus share a common elongated conductor and wherein a voltage terminal is connected to a conductor of said first pair of elongated electrical conductors.

14. The liquid level switch of claim 10 wherein said first electrically conductive area is positioned near a lower portion of said switch and said second electrically conductive area is positioned near an upper portion of said switch and said third electrically conductive area is positioned between the first and second electrically conductive areas for producing low high and intermediate liquid level output signals respectively.

15. The liquid level switch of claim 14 wherein said first and second pair of elongated electrical conductors of said first elongated non-electrically conductive substrate are laterally coupled Together and thus share a common elongated conductor and wherein a voltage terminal is connected to an outer conductor of said first pair of elongated electrical conductors.

* * * * *